April 17, 1962     J. G. JACKSON     3,029,690
OPTICAL MICROMETER
Filed March 31, 1958     4 Sheets-Sheet 1
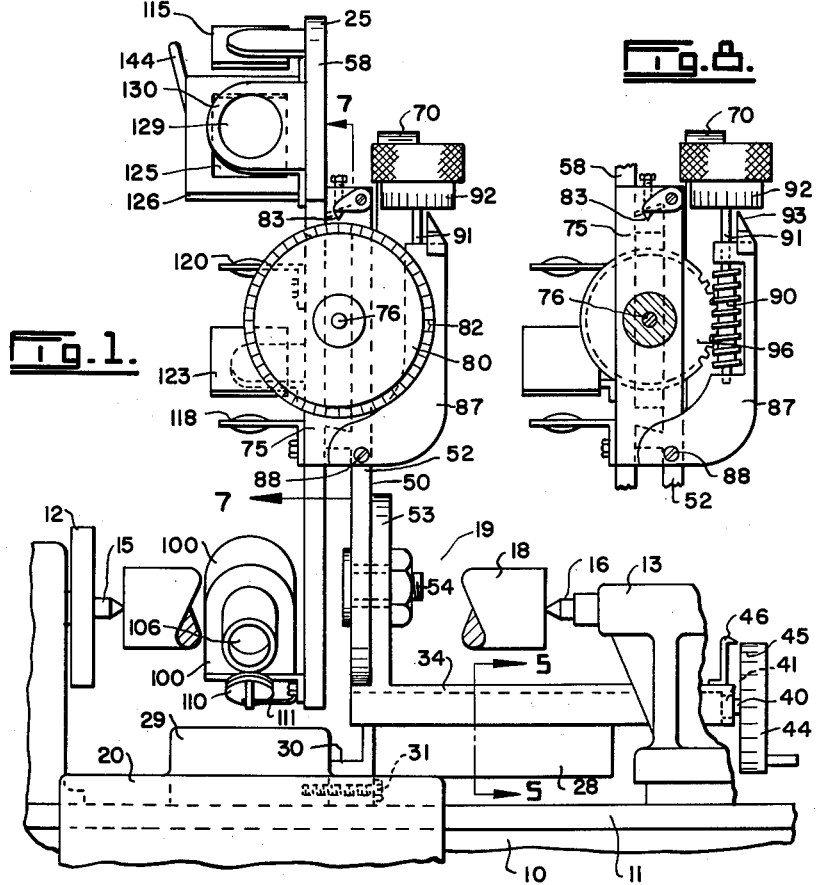
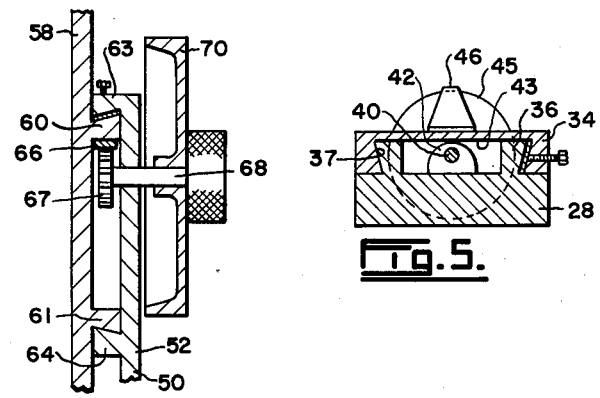
INVENTOR
JAMES GORDON JACKSON
BY
Fetherstonhaugh & Co.
ATTORNEYS

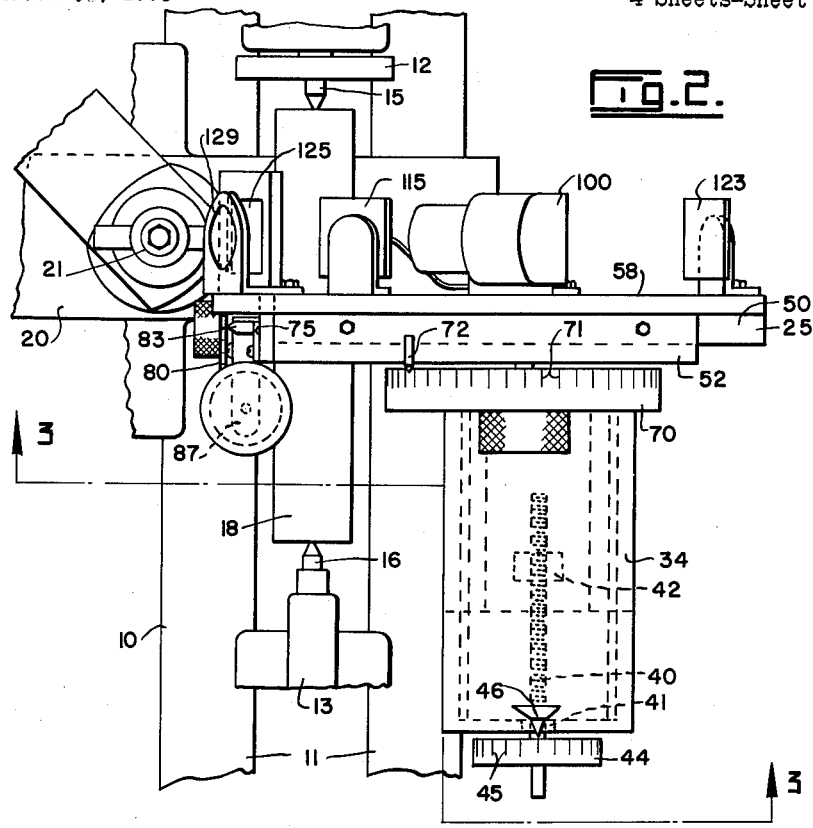

April 17, 1962 J. G. JACKSON 3,029,690
OPTICAL MICROMETER
Filed March 31, 1958 4 Sheets-Sheet 4
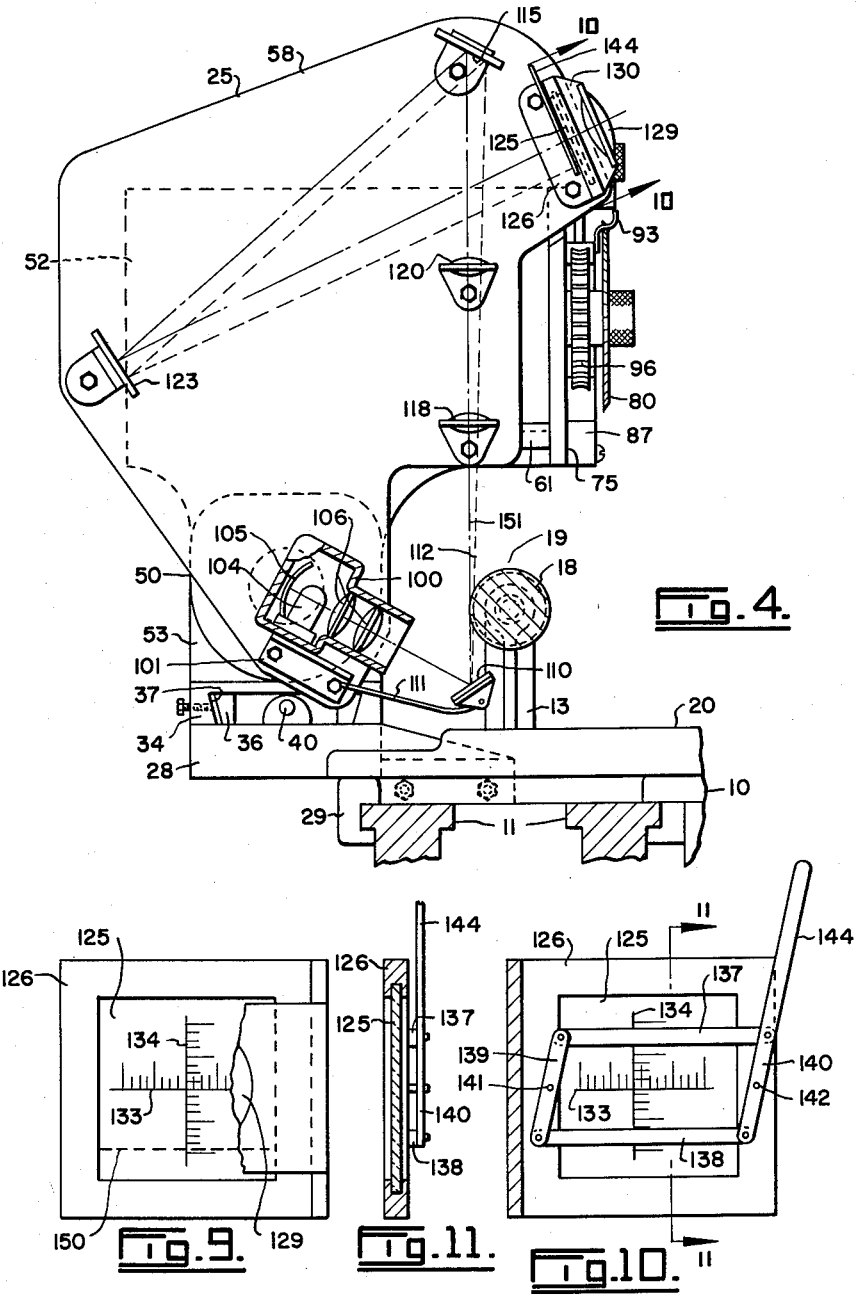
INVENTOR
JAMES GORDON JACKSON
BY
Featherstonhaugh & Co.
ATTORNEYS United States Patent Office 3,029,690
Patented Apr. 17, 1962

3,029,690
OPTICAL MICROMETER
James Gordon Jackson, 210 Kingsway S., Port Alberni,
British Columbia, Canada
Filed Mar. 31, 1958, Ser. No. 725,132
3 Claims. (Cl. 88—24)

This invention relates to an optical micrometer particularly for lathes, but which might be used for other purposes as well.

An object of the present invention is the provision of an optical micrometer particularly for lathes, and which will indicate a required dimension of a piece of work, such as a shaft in a lathe while the latter is in operation.

Another object is the provision of an optical micrometer for lathes which will indicate shaft diameters in a very clear and true manner, and by means of which minute adjustments may be made and the results clearly seen.

Another object is the provision of a micrometer for testing the trueness of shafts in a lathe while the latter is in operation.

Yet another object is the provision of a micrometer for measuring tapers in shafts mounted in lathes while said lathes are running.

The present optical micrometer is designed to be mounted near the work area of a lathe. It has been found desirable to mount the micrometer on the lathe carriage. The micrometer includes means for projecting a beam of light past the edge of a piece of work held in the lathe centres and on to a screen, said screen having a main reticle thereon. When the beam of light is shifted relative to the work piece, the image of the edge of said work piece shifts on the screen relative to the reticle. The micrometer includes calibrated means for indicating the distance of the work piece edge from the lathe centre when the image of said edge coincides with the screen reticle.

This optical micrometer is used with lathes having work areas in which pieces of work are supported. The micrometer includes a base mounted to one side of the lathe work area, a support slidably mounted on the base and projecting over the lathe work area, said support being movable towards and away from the work area, a screen carried by the support above the work area, a main reticle on the screen, projection means on the support for directing a beam of light past the edge of a work piece carried by the lathe in the work area thereof on to the screen, said support being adjustable on the base to make the image of the work piece edge coincide with the main reticle on the screen, and calibrated means associated with the base and support for indicating the position of the work piece edge at this time.

Figure 3:
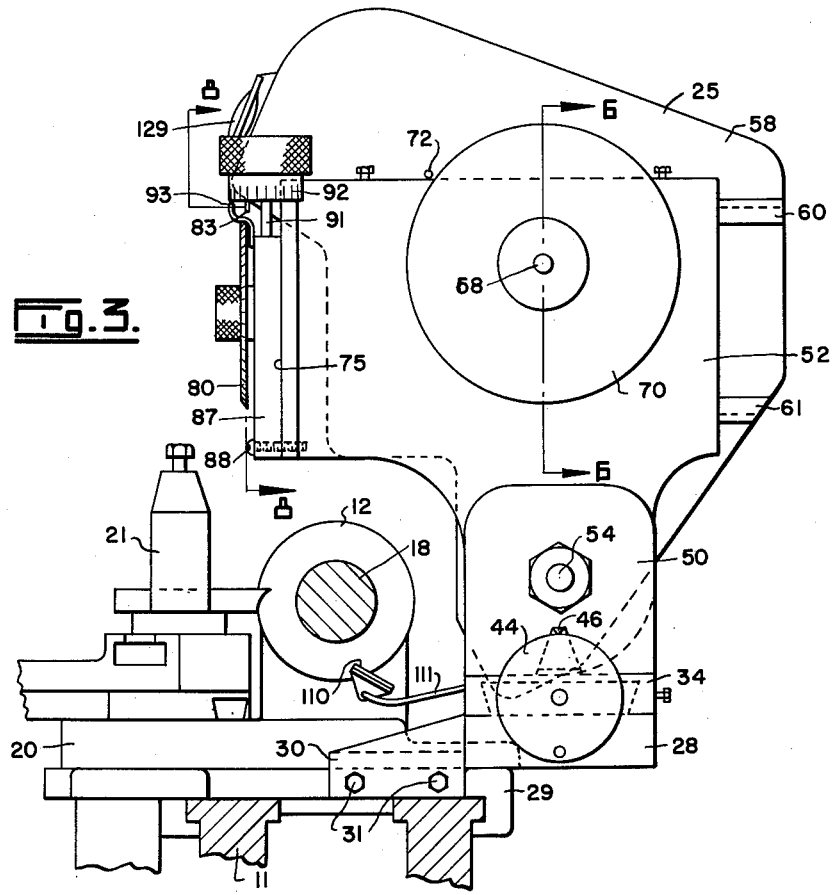
Figure 7:
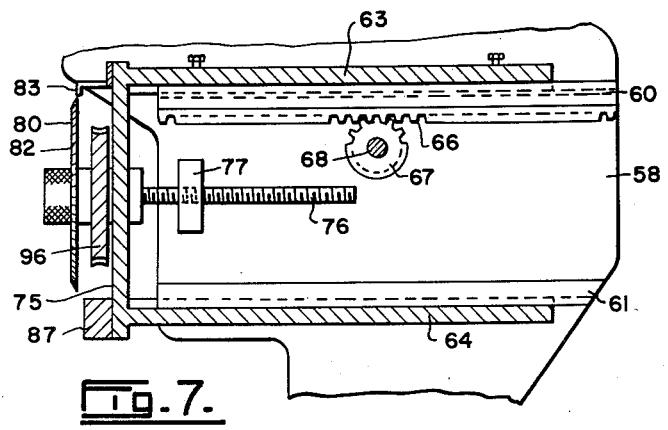

An example of this invention is illustrated in the accompanying drawings, in which, FIGURE 1 diagrammatically illustrates a portion of a lathe with the optical micrometer mounted thereon, said micrometer being shown in front or end elevation, FIGURE 2 is a plan view of the micrometer mounted on the lathe, FIGURE 3 is a sectional view taken on the line 3—3 of FIGURE 2, showing one side of the micrometer in elevation, FIGURE 4 is an elevation of the opposite side of the micrometer from that shown in FIGURE 3, FIGURE 5 is an enlarged sectional detail taken on the line 5—5 of FIGURE 1, FIGURE 6 is an enlarged sectional detail taken on the line 6—6 of FIGURE 3, FIGURE 7 is a vertical section taken on the line 7—7 of FIGURE 1, FIGURE 8 is a section taken on the line 8—8 of FIGURE 3, FIGURE 9 is an enlarged front elevation of the screen of the micrometer, FIGURE 10 is an enlarged sectional view taken on the line 10—10 of FIGURE 4, showing the screen, and FIGURE 11 is a section taken on the line 11—11 of FIGURE 10.

Referring to the drawings, 10 is a lathe of any standard construction having the usual bed 11 with a head stock 12 at one end, and a tailstock 13 slidably mounted on the bed adjacent the opposite end thereof. Aligned spindles 15 and 16 project inwardly from the head stock and tailstock to hold the pieces to be worked on in the lathe, such as a shaft 18. The work piece is located in a work area of the lathe generally designated by the numeral 19. This type of lathe has a carriage 20 slidably mounted on the bed, said carriage being provided with a tool holder 21 positioned above and to one side of the lathe bed.

The reference numeral 25 generally designates this optical micrometer which may be mounted on or near lathe 10 in any convenient manner. This device and/or part of it is preferably movable longitudinally and transversely relative to the lathe. It has been found most desirable to mount the optical micrometer on or to connect it to the movable carriage 20.

A horizontal base plate 28 is mounted on a portion 29 of carriage 20 opposite tool holder 21, said base plate being connected to the carriage in any desired manner. In this example, the base plate has an inwardly-projecting bracket 30 that is secured to the carriage over lathe bed 11 by bolts 31. A base 34 is mounted on plate 28 for movement longitudinally of the lathe in any convenient manner. For this purpose, plate 28 has been provided with a dovetail tongue 36 on its upper surface extending longitudinally thereof, that is, longitudinally of the lathe, and base 34 has a corresponding dovetail groove 37 in its undersurface, see FIGURES 3 and 5. The base is moved relative to the base plate by means of a feed screw 40 journalled in a bearing 41 carried by one end of base 34. This screw is threaded through a lug 42 mounted on plate 28 with a recess formed in tongue 36. A crank drum 44 is fixedly mounted on the other end of the feed screw, and this drum may have graduations 45 on its outer surface which are moved past a pointer 46 when the drum is rotated to shift base 34 along base plate 28.

A base or standard 50 is secured to and projects upwardly from base 34. Although this standard may be made in one piece, it is preferable to make it in upper and lower sections 52 and 53 hingedly secured together in any suitable manner, such as by means of a bolt 54. When the apparatus is in operation, section 52 of the standard extends upwardly from section 53 thereof, but said upper section may be swung outwardly relative to the lathe or removed from the lower section when not required. By referring to FIGURE 3, it will be seen that the upper section 52 is relatively large and extends transversely of the lathe and projects inwardly over the bed 11 thereof.

A comparatively large vertical support 58 is slidably mounted on the upper section of the standard for movement transversely of the lathe. This support is in the form of a frame or plate extending transversely of the optical micrometer and the lathe. A suitable sliding connection is provided between standard 50 and support 58. In this example, the support is provided with upper and lower horizontal dovetail tracks 60 and 61 which interfit with correspondingly-shaped upper and lower dovetail tracks 63 and 64 projecting from the upper section of the standard, see FIGURES 6 and 7. A rack 66 is mounted on the lower surface of track 60 of the support and meshes with a pinion 67 mounted on the inner end of shaft 68 journalled in standard 50 and projecting outwardly therefrom. An indicating drum 70 is fixedly mounted on the outer end of this shaft, said drum having calibrations 71 on its outer surface which are read by means of an indicator 72 mounted on the standard and projecting over this drum. These calibrations are in hundredths of an inch and read from zero to the full capacity of the lathe, that is, the maximum work diameter the lathe can handle.

The upper section 52 of standard 50 has a vertical front wall 75 with a feed screw 76 journalled therein. This screw extends horizontally between support 58 and standard 50 beneath the tracks 60—63 thereof, see FIGURE 8. This screw is threaded through a lug 77 fixedly mounted on support 58 and extending toward the standard. A dial 80 is fixedly mounted on the outer end of screw 76 and calibrated at 82 around its periphery, these calibrations being in thousandths of an inch and reading from zero to one hundred. A pointer 83 is mounted on wall 75 above this dial. Rotation of dial 80 shifts support 58 relative to the upper section 52 of the standard and transversely of the lathe. This movement causes drum dial 70 to rotate to indicate at pointer 72 the relative position of the support.

If desired, vernier means may be provided for fine adjustments through dial 80. For this purpose, a bracket 87 is mounted on the wall 75 of standard 50, and although this bracket may be fixedly mounted on the wall, it is preferable to pivotally mount it by means of a pivot pin 88, see FIGURES 1 and 8. A vertically disposed worm 90 is rotatably carried by bracket 87 and is connected to a shaft 91 projecting upwardly therefrom. A vernier dial 92 is mounted on the upper end of the shaft and has an indicator 93 near it, said indicator being supported by bracket 87. This vernier dial is calibrated in ten thousandths of an inch and reads from zero to ten. Worm 90 meshes with a worm gear 96 fixedly mounted on feed screw 76 immediately behind dial 80. Thus, rotation of vernier dial 92 causes screw 76 and dial 80 to rotate.

The vernier dial 92 is used only for very fine adjustments, and when not required, bracket 87 may be swung outwardly on pin 88 to disengage worm 90 from worm gear 93.

Support 58 carries the optical part of this equipment, said optical part being shown in FIGURES 1, 2 and 4.

A light projector 100 is mounted on support 58 in any convenient manner, such as by bolts 101. This projector may be of any desired construction, and it has a light source 104, reflector 105, and suitable condenser lenses 106. Light is projected on to a mirror 110 that is supported over lathe bed 11 by an arm 111 projecting from support 58. In this example, arm 111 is secured to the support by means of one of the bolts 101. Mirror 110 is arranged at an angle to the beam of light from the projector in order to direct said beam through a projection area 112 of the micrometer on to another mirror 115 mounted on support 58 near the top thereof and above mirror 110. Projection area 112 of the micrometer coincides with work area 19 of the lathe when the micrometer is used on the latter. Mirror 115 faces generally downwardly and is arranged at an angle relative to the beam of light from mirror 110.

It is desirable to insert one or more magnifying lenses between mirrors 110 and 115. In this example, the primary lens 118 is mounted on support 58 above the area where the piece of work or shaft 18 is supported by the lathe. A secondary lens 120 is mounted on the support above lens 118. Lens 118 is positioned to focus the image of an edge of shaft 18 at a point just below the secondary lens with an image ratio of about 2 to 1. Lens 120 is a short focus lens and has a ratio of about 25 to 1, so that the total magnification by the primary and secondary lenses is approximately 50 to 1.

Mirror 115 faces another mirror 123 mounted on support 58 below the former mirror and outwardly of the lathe. Mirror 123 is arranged at an angle to the beam of light from mirror 115, and projects said beam on to an inclined translucent screen 125 mounted in a frame 126 secured to and projecting outwardly from support 58 near the top thereof and over the lathe bed. If desired, a magnifying lens 129 may be supported over and spaced from screen 125 by a bracket 130 which is carried by frame 126. Any suitable lens and mirror arrangement may be used between the light source and the screen. In fact, the screen may be arranged horizontally above reflector 110, in which case, the latter may direct the light beam on to the screen with or without lens means therebetween. It is, however, desirable to provide magnifying means between mirror 110 and the screen.

A main reticle mark or wire 133 extends horizontally across the centre of screen 125, see FIGURE 9. If desired, a vertical wire or reticle 134 may extend across the centre of the screen.

If desired, two secondary horizontal reticles may be provided for movement towards and away from the main reticle 133. The secondary reticles are in the form of parallel bars 137 and 138 pivotally mounted on the outer end of links 139 and 140 which, in turn, are pivotally mounted centrally thereof at 141 and 142 on frame 126. Link 140 may be produced upwardly to provide an operating handle 144. Movement of this handle back and forth shifts bars 137 and 138 towards and away from each other while keeping them parallel with the main reticle 133.

Dials 70 and 80 may be zeroed relative to the longitudinal centre line of the lathe around which the work therein rotates. In actual practice, a specimen shaft of a known diameter would be placed between and gripped by the head stock and tailstock spindles 15 and 16. Support 58 would be shifted until a beam of light from projector 100 casts an image of the edge of the shaft on screen 125, said edge coinciding with horizontal reticle 133. The dials would then be set to indicate that diameter.

When shaft 18 is inserted in work area 19 of the lathe, the exact diameter may be measured in the following manner: dial 80 is turned to move support 58 with the optical parts thereon outwardly of the lathe until light from projector 100 and passing through work area 112 fills screen 125, at which time the light beam clears the edge of the shaft. Dial 80 is then turned in the opposite direction to bring the image of the edge of the shaft on to the lower part of the screen, as indicated at 150 in FIGURE 9. The dial is turned further in the same direction until the image coincides with main reticle 133. Line 151 in FIGURE 4 represents the path of travel of the image. Dials 70 and 80 indicate the exact diameter of the shaft in thousandths of an inch. If a reading of ten thousandths of an inch is required, vernier dial 92 is used. One turn of the vernier dial equals one graduation on dial 80, and one turn on the latter equals one graduation on dial 70.

If it is desired to reduce the shaft diameter, dials 70 and 80 are set to the required size. This will move the image above the main reticle. The shaft is then machined until the image again coincides with the reticle, at which time it is of the required diameter. Thus the micrometer measures the shaft even while the lathe is in operation.

If the shaft is not true, the image will not register with the horizontal reticle on the screen, but it will wobble up and down as the shaft rotates. Bars 137 and 138 represent adjustable reticles. The secondary reticles are adjusted to the amount of wobble of the image, and when the image reaches both of these reticles during the wobble, the reading is average, and the diameter of the shaft is registered on the dials.

The taper of a shaft may be measured with this optical micrometer. Measurements may be taken at different points throughout the length of the shaft while it is rotating in the lathe to indicate the shaft taper. The device is shifted longitudinally of the shaft by moving carriage 20 and/or turning crank drum 44.

While the light beam of the micrometer is shown travelling upwardly past the work piece or shaft, it will be understood that it may travel in other directions. It must, however, travel past the shaft, and support 58 must travel towards and away from said shaft in a direction substantially at right angles to the portion of the light beam passing the shaft.

What I claim as my invention is:

1. An optical micrometer for lathes having work areas in which pieces of work are supported, comprising a base mounted to one side of the work area of a lathe with which the micrometer is used, a standard projecting upwardly from the base, a support mounted on the standard for substantially horizontal movement towards and away from the work area of the lathe, said micrometer having a projection area adapted to coincide with the lathe work area, a screen carried by the support above the projection area, a main reticle on the screen, means carried by the support for directing a beam of light upwardly through said projection area and on to the screen, said beam being adapted to project an image of a work piece in the work area on to said screen, a calibrated indicating drum fixedly mounted on a first shaft rotatably carried by the standard, rotating means on the support and the shaft for rotating said shaft and the drum back and forth during movement of the support towards and away from the work area of the lathe, an indicator on the standard at the drum to indicate on the latter the position of the support, a second shaft journalled in the standard and connected to the support to move said support back and forth on rotation of the shaft in opposite directions, and a calibrated dial fixedly mounted on said second shaft and readable against an indicator on the standard whereby rotation of the dial causes relative movement between the support and the standard and thereby shifting the light beam across the projection area, the relative position of the support and standard being indicated by the calibrations of the drum and dial, and the relative position of the standard and the support when an image of said work piece in the work area is projected on to the screen and coincides with said main reticle being proportional to the diameter of said work piece at that time.

2. An optical micrometer as claimed in claim 1 including a bracket pivotally mounted on the standard for movement towards and away from said second shaft, a vernier dial rotatably mounted on the bracket, and disconnectable drive means connected to the dial and the second shaft to rotate the latter when the dial is rotated and the bracket is positioned near said second shaft, said drive means being disconnected when the bracket is swung away from the second shaft.

3. An optical micrometer for lathes having work areas in which pieces of work are supported, comprising a base mounted to one side of the work area of a lathe with which the micrometer is used, a standard projecting upwardly from the base, a support mounted on the standard for substantially horizontal movement towards and away from the work area of the lathe, said micrometer having a projection area adapted to coincide with the lathe work area, a screen carried by the support above the projection area, a main reticle on the screen, a mirror carried by the support below said projection area, a projector on the support above the base and to one side of the projection area for directing a beam of light on to the mirror, light magnifying means above the projection area, said mirror being set to direct said beam through the projection area, the light magnifying means and on to the screen, a calibrated indicating drum connected to the standard and the support so as to rotate during relative movement therebetween, means carried by the standard and connected to the support for moving the latter relative to the former, and a calibrated dial connected to the moving means whereby rotation of the dial causes relative movement between the support and the standard and thereby shifting the light beam across the projection area, the relative position of the support and standard being indicated by the calibrations of the drum and dial, and the relative position of the standard and the support when an image of said work piece in the work area is projected on to the screen and coincides with said main reticle being proportional to the diameter of said work piece at that time.

References Cited in the file of this patent

UNITED STATES PATENTS

| | | |
|---|---|---|
| 1,959,537 | Kuhne | May 22, 1934 |
| 2,192,529 | Thomas et al. | Mar. 5, 1940 |
| 2,245,527 | Grabfield | June 10, 1941 |
| 2,334,329 | Isaacson | Nov. 16, 1943 |
| 2,485,355 | Brennan | Oct. 18, 1949 |
| 2,845,756 | Papke | Aug. 5, 1958 |